Nov. 29, 1949     H. WOCHNER     2,489,842
PLIER FOR REMOVING BALANCE WEIGHTS
Filed Feb. 27, 1947
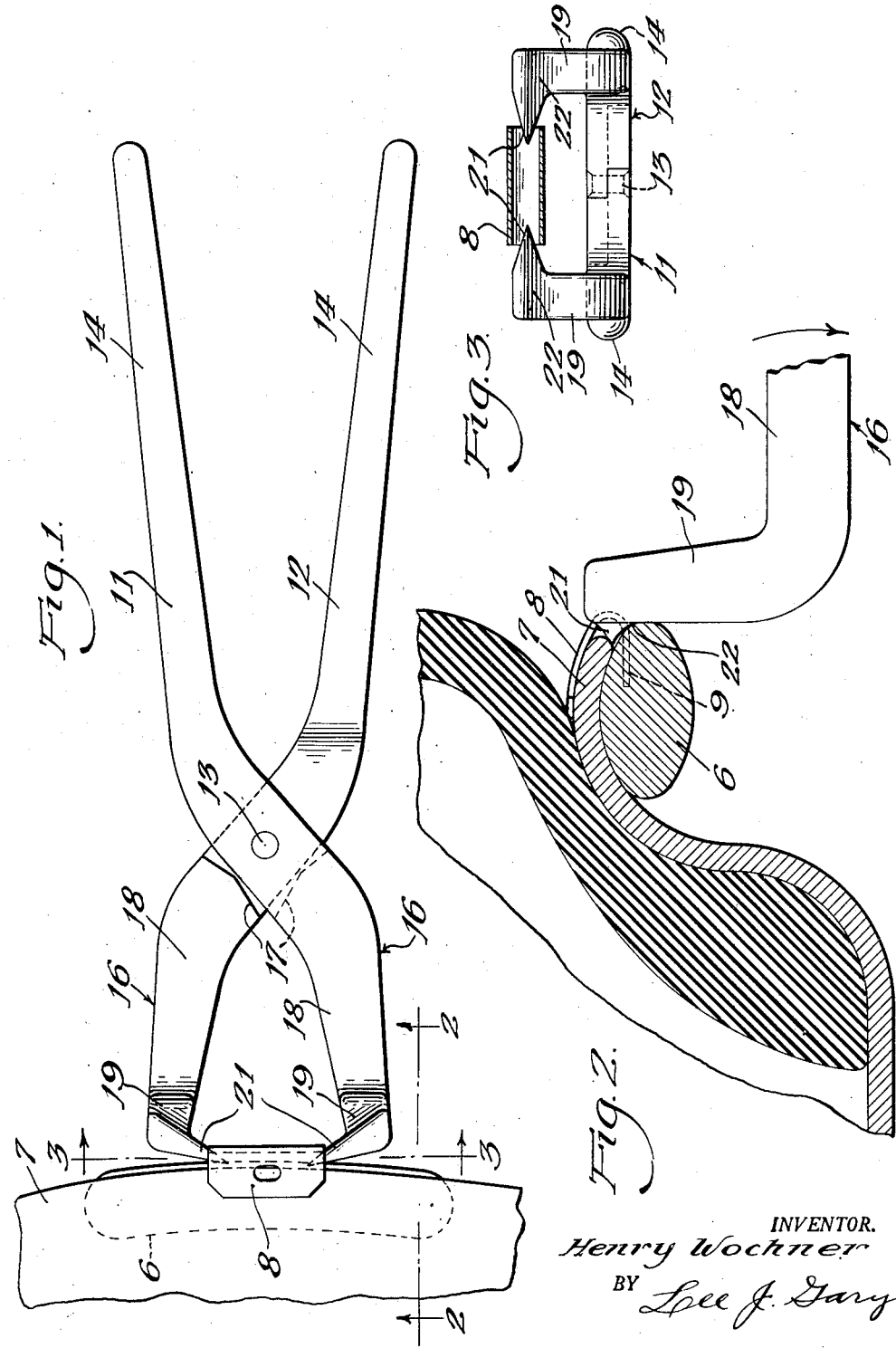
INVENTOR.
Henry Wochner
BY Lee J. Gary
Attorney Patented Nov. 29, 1949

2,489,842

UNITED STATES PATENT OFFICE 2,489,842

PLIER FOR REMOVING BALANCE WEIGHTS

Henry Wochner, Rock Island, Ill., assignor to Bear Manufacturing Company, Rock Island, Ill., a corporation of Delaware Application February 27, 1947, Serial No. 731,337

2 Claims. (Cl. 254—131)

This invention relates to improvements in a plier construction for removing balance weights from automobile wheels. In order to insure stability at all speeds, the wheels of automobiles must be balanced accurately to prevent vibration, shimmy, and abnormal wear on tires, wheel bearings, king pin, tie rod ends, steering gear and connecting links. The usual method of balancing a wheel is by placing weights on the rim adjacent the lightest point of the wheel. In most instances, two weights are sufficient to static balance a wheel. However, in the event that two relatively large weights are insufficient, a third weight may be added. In order to correct a dynamic unbalanced wheel condition, balance weights should ordinarily be applied to the inside of a wheel first; after which, it may be necessary to transfer the weights or portion of same to the outer side of the wheel.

In correcting a static or dynamic unbalanced condition in an automobile wheel, it is often necessary to adjust the positions of the weights several times before the wheel is perfectly balanced. It is an object of the present invention to provide a plier construction adapted for use in removing weights from automobile wheels.

It is a further object of this invention to provide a weight removing plier construction which will not damage the weights during removal of same from automobile wheels.

It is a further object of this invention to provide a plier construction which is relatively inexpensive to manufacture, and which will not readily get out of order.

This invention embodies other novel features, details of construction and arrangement of parts which are hereinafter set forth in the specification and claims, and illustrated in the accompanying drawing wherein:

Fig. 1 is a plan view showing a plier construction embodying features of this invention and the manner of using same in removing a weight from an automobile wheel.

Fig. 2 is an enlarged fragmentary sectional view taken along the line 2—2 of Fig. 1.

Fig. 3 is a sectional view taken along the line 3—3 of Fig. 1.

Referring now to the drawing for a better understanding of this invention, a balance weight 6 formed of lead is detachably mounted upon the rim 7 of an automobile wheel by means of a resilient steel clip 8 having its one end imbedded at 9 within the weight. The construction of balance weights 6 and the method of applying same to automobile wheels to correct static and dynamic unbalanced conditions is well known in this art. It is also well known that it is necessary to change the positions of the weights several times before the unbalanced condition of a wheel is corrected.

In order to facilitate the removal of the balance weights 6 from automobile rims 7, the present invention contemplates the provision of a plier construction comprising a pair of members 11 and 12 which are pivotally connected intermediate their ends by means of a bolt or rivet 13. Each of the members 11 and 12 is provided with a handle 14 and a jaw 16. The members 11 and 12 are also formed with stop shoulders 17 to limit the inward or outward pivotal movement of the jaws 16.

The jaws 16 are formed to extend forward at 18 along the same plane as the handles 14, and then to extend upwardly at 19 to terminate with pointed wedge-shaped ends 21. The pointed wedge-shaped ends 21 are disposed in opposing relation for insertion between the edge of a tire rim 7 and the side edges of a weight clip 8, as illustrated in Figs. 1 and 2 in the drawing. A concave surface 22 is formed on the front side of each jaw portion 19 and adjacent the pointed wedge-shaped ends 21 for engagement against the adjacent portion of a balance weight 6, as illustrated in Fig. 2 of the drawing.

In the use of the plier for removing balance weights 6 from the rim 7 of an automobile wheel, the pointed wedge-shaped ends 21 of the jaws 16 are inserted between the edge of the rim 7 and the side edges of the resilient steel clip 8 in the manner illustrated in Fig. 1 of the drawing. After the pointed wedge-shaped ends 21 are inserted between the rim 7 and the inner wall of the clip 8, pressure is exerted on the handles 14 in the direction indicated by the arrow in Fig. 2 to cause the concave surfaces 22 of the jaws 16 to engage the adjacent surface of the weight 6 which then serves as a fulcrum for the plier and causes the metal clip 8 to be drawn out of engagement with the rim 7. It will thus be seen that a plier constructed in the manner shown and described is adapted to facilitate the removal of balance weights from automobile rims.

While this invention has been shown in but one form, it is obvious to those skilled in the art that it is not so limited but is susceptible of various changes and modifications without departing from the spirit and scope of the claimed invention.

I claim as my invention:

1. In a plier for engagement with a balance weight clip mounted on an automobile wheel rim, a pair of pivotally connected members, opposing clamping jaws formed on one end of said members, opposing handles formed on the other end of said members, each jaw having a pointed wedge-shaped end disposed toward its opposing jaw, and being substantially right-triangular in a section taken in a plane parallel to the plane of movement of the jaws about the pivot whereby said jaws are insertable between an automobile wheel rim and a balance weight clip mounted thereon, each jaw having a concave surface adjacent its pointed wedge-shaped end to engage the adjacent portion of a balance weight, whereby the balance weight serves as a fulcrum during disengagement of the balance weight clip from the automobile wheel rim.

2. In a plier for engagement with a balance weight clip mounted on an automobile wheel rim, a pair of pivotally connected members, opposing clamping jaws formed on one end of said members, opposing handles formed on the other end of said members, said jaws extending forward, thence upward and thence inward, said jaws comprising opposing pointed wedge-shaped ends to be inserted between an automobile wheel rim and opposite side edges of a balance weight clip, each jaw having a concave surface adjacent its pointed wedge-shaped end said surfaces being in substantial alignment with each other when said jaws engage the adjacent portion of a balance weight, whereby the balance weight serves as a fulcrum during disengagement of the balance weight clip from the automobile wheel rim.

HENRY WOCHNER.

REFERENCES CITED

The following references are of record in the file of this patent:

UNITED STATES PATENTS

| Number | Name | Date |
|---|---|---|
| 749,454 | Scott | Jan. 12, 1904 |
| 1,073,802 | Fulghum | Sept. 23, 1913 |
| 1,338,043 | Sandin | Apr. 27, 1920 |
| 1,463,645 | Wright | July 31, 1923 |
| 2,274,126 | Carrigan | Feb. 24, 1942 |

FOREIGN PATENTS

| Number | Country | Date |
|---|---|---|
| 349,591 | Germany | Sept. 16, 1920 |